United States Patent
Takayama et al.

(10) Patent No.: US 12,134,665 B2
(45) Date of Patent: Nov. 5, 2024

(54) PREPARING METHOD FOR POLYMER, COMPOSITION FOR RADICAL POLYMERIZATION AND CONTROL AGENT FOR RADICAL POLYMERIZATION

(71) Applicant: National Tsing Hua University, Hsinchu (TW)

(72) Inventors: Takumi Takayama, Okayama (JP); Kazuhiko Maekawa, Okayama (JP); Tomoya Hosoki, Ibaraki (JP); Chi-How Peng, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 17/704,106

(22) Filed: Mar. 25, 2022

(65) Prior Publication Data
US 2022/0325013 A1    Oct. 13, 2022

(30) Foreign Application Priority Data
Apr. 2, 2021    (JP) .................................. 2021-063656

(51) Int. Cl.
*C08F 16/06*    (2006.01)
*C08F 2/38*    (2006.01)
*C08F 293/00*    (2006.01)

(52) U.S. Cl.
CPC ................ *C08F 16/06* (2013.01); *C08F 2/38* (2013.01); *C08F 293/005* (2013.01); *C08F 2438/02* (2013.01)

(58) Field of Classification Search
CPC ........ C08F 16/06; C08F 293/005; C08F 8/00; C08F 118/08
See application file for complete search history.

(56) References Cited

U.S. PATENT DOCUMENTS

| | | | | |
|---|---|---|---|---|
| 6,046,272 A | * | 4/2000 | Phung | ........................ C08F 8/12 525/61 |
| 2021/0147629 A1 | * | 5/2021 | Okaniwa | ................ H01L 23/293 |

FOREIGN PATENT DOCUMENTS

| | | | | |
|---|---|---|---|---|
| DE | 19920553 A1 | * | 9/1999 | ................ C08F 2/38 |
| JP | 6767035 B1 | | 6/2016 | |

(Continued)

OTHER PUBLICATIONS

Fazekas et al. ACS Omega 2018, 3, 16945-16953 (Year: 2018).*

(Continued)

*Primary Examiner* — Mark S Kaucher
(74) *Attorney, Agent, or Firm* — MUNCY, GEISSLER, OLDS & LOWE, P.C.

(57) ABSTRACT

The present invention provides a preparing method of a polymer which is low-toxic, environmental-friendly, highly controllable, and low cost to obtain a polymer with high molecular weight. The preparing method comprises conducting a controlled radical polymerization process of monomer (Y). In the controlled radical polymerization process, organic compound (A) which has the formula (I) and radical initiator (B) are existing in a mole ratio (B/A) ranged from 0.5 to 25,

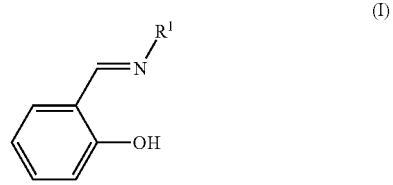

(I)

wherein $R^1$ is a hydrogen atom, alkyl group, aryl group, or hydroxyl group, the alkyl group can be alkyl having (Continued)

substituents or alkyl substituent, and the aryl group can be aryl having substituents or aryl substituent.

3 Claims, 1 Drawing Sheet

(56) References Cited

FOREIGN PATENT DOCUMENTS

WO    WO2017/170971 A1    3/2017
WO    WO-2019208615 A1 *    10/2019   ......... B23K 35/3612

OTHER PUBLICATIONS

Kermagoret et al. European Polymer Journal 62, 2015, 312-321 (Year: 2015).*
Li et al. Journal of Polymer Science, Part A: Polymer Chemistry 2019, 57, 1653-1663 (Year: 2019).*
Carradori et al. Bioorganic & Medicinal Chemistry Letters (Year: 2013).*
Patil Oriental Journal of Chemistry (Year: 2018).*
Antoine Debuigne, "Highly Efficient Cobalt-Mediated Radical Polymerization of Vinyl Acetate," Angewandte Chemie International Edition, 2005, vol. 44, pp. 1101-1104.
Yanguang Zhao, "Visible-Light-Induced Living Radical Polymerization Mediated by (salen)Co(II)/TPO at Ambient Temperature," Macromolecules, Jul. 28, 2015, vol. 48, pp. 5132-5139.

* cited by examiner

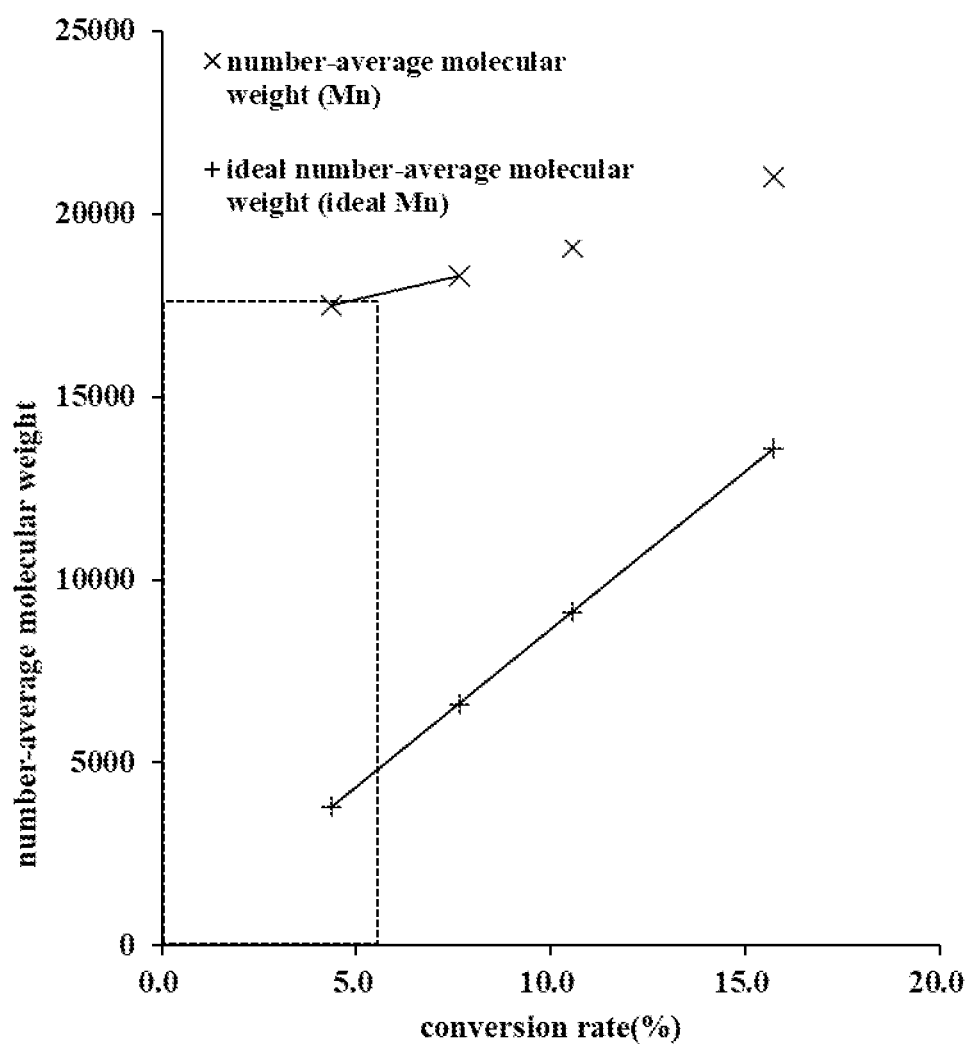

PREPARING METHOD FOR POLYMER, COMPOSITION FOR RADICAL POLYMERIZATION AND CONTROL AGENT FOR RADICAL POLYMERIZATION

CROSS-REFERENCE TO RELATED APPLICATIONS

This application claims priority under 35 U.S.C. § 119(e) to Japan Patent Application Ser. No. 2021-063656, filed on Apr. 2, 2021, the entire contents of which are hereby incorporated by reference.

FIELD OF THE INVENTION

The present invention relates to a preparing method of a polymer, more particularly to a controlled radical polymerization. In addition, the present invention also relates to a composition for radical polymerization and a control agent for radical polymerization of the preparing method.

BACKGROUND OF THE INVENTION

Poly(vinyl alcohol) resin is a kind of water-soluble crystalline polymer material. Poly(vinyl alcohol) resin has been widely applied in emulsifier, dispersant, surfactant, textile treating agent, binder, paper treating agent, adhesive, and film. Poly(vinyl alcohol) resin can be applied for different purposes according to its varying degrees of saponification or polymerization. Various poly(vinyl alcohol) resins with special function can be obtained by being modified with different functional groups.

In industrial manufacturing, poly(vinyl alcohol) is produced by radical polymerization of vinyl acetate and the following saponification process of the poly(vinyl acetate). Precise controlled molecular arrangement and end structures of poly(vinyl acetate) (and poly(vinyl alcohol)) can be hardly obtained by the mentioned conventional radical polymerization process due to side reactions such as chain transfer reaction or recombination-termination reaction.

In recent years, based on the development of living radical polymerization, some controlled polymerization processes of vinyl acetate are provided. For example, initiator and control agent are added in the polymerization process to prepare poly(vinyl acetate) with a precisely controlled structure. In this case, the propagating radical chain end of the poly(vinyl acetate) can form the covalent bond with the control agent to become the dormant species. The dormant species and the dissociated radicals will reach equilibrium during the polymerization process. The polymerization reaction is called controlled radical polymerization.

However, it is difficult to obtain poly(vinyl acetate) with large molecular weight by the controlled radical polymerization because there are chances to generate the Head-to-Head coupling (i.e., forming the poly(vinyl acetate) with the adjacent acetyl groups) during the polymerization reaction. The chain-end radicals of the poly(vinyl acetate) with the Head-to-Head coupling is highly thermal-unstable. It makes the equilibrium in the polymerization reaction shift to the dormant species side and terminates the polymerization reaction. On the other hand, raising the temperature to dissociate the dormant species could keep on the polymerization, but the reaction becomes less controllable. Thus, it is very difficult to obtain poly(vinyl acetate) with large molecular weight and to keep the polymerization controlled at the same time.

According to the above problem, a synthesizing method of poly(vinyl acetate) with large molecule weight which uses organic cobalt complex as a control agent is provided. In this case, the propagating radical chain end of the poly(vinyl acetate) can form the covalent bond with the cobalt atom of the organic cobalt complex to become the dormant species. The dormant species and the dissociated radical molecules will reach equilibrium during the polymerization process. For example, Non-Patent Document 1 discloses a polymerization of vinyl acetate under existing of cobalt(II) acetylacetonate, where number-average molecular weight (Mn) of poly(vinyl acetate) is 99,000, and polydispersity index (Mw/Mn) of poly(vinyl acetate) is 1.33.

Patent Document 1 discloses a problem of significant color shown in the controlled radical polymerization of poly(vinyl alcohol). Using organic cobalt complex as the control agent to control the radical polymerization and obtain poly(vinyl acetate) solution. Then the poly(vinyl acetate) solution is mixed with aqueous solution having water-soluble functional groups. After the cobalt complex is extracted from the mixed solution, a saponification process is conducted to obtain poly(vinyl alcohol) with less impact of the color issue.

However, the disadvantage of this method is the difficulty to remove the metal complex completely. Most transition metals have high toxicity, so the polymer obtained from the method often causes environmental problems due to the toxicity of the remained transition metals. It is unsafe to use the polymer with transition metals as food package material or biomedical material. The unreacted complex or reacted complex which is removed from the polymer may also cause environmental problems. Other problems such as the extraction liquid used to remove the complex cannot be recycled, and the complicated processes raise the cost. Another problem is that the metal complex is quite expensive and its synthetic process is complicated.

Another living radical polymerization method by using subnitrate, iodide, or dithioester compounds is also known. However, there are some obvious disadvantages of using the method. Such as the necessity to introduce special protecting groups into the propagating chains of polymers, and the protecting groups are extremely expensive. The polymerization reaction needs to be conducted at a high temperature (such as over 110° C.). High molecule weight is difficult to be approached due to the incomplete polymerization controllability of vinyl acetate monomer. The produced polymer has bothersome properties such as color or odor. Furthermore, it is not easy to remove the used compounds from the product, and health or environmental problems may be caused by the remained organic halogen compounds or organic sulfide.

In addition, plurality structures of Schiff base compound and the derivatives are well-known and used as ligands in organometallic chemistry (such as Patent Document 2). Particularly the cobalt complexes. Using a cobalt atom as an activity center for the control agent of controlled radical polymerization is also well-known (such as Non-Patent Document 2). However, using salen ligands itself as a control agent of the controlled radical polymerization is not known yet, and the purpose is not hypothesized in the academic world.

PRESENT TECHNICAL DOCUMENTS

Patent Documents

<Patent Document 1> WO2017/170971A1
<Patent Document 2> JP6767035B1

Non-Patent Documents

<Non-Patent Document 1> Highly Efficient Cobalt-Mediated Radical Polymerization of Vinyl Acetate, Angewandte Chemie International Edition, 2005, vol. 44, p 1101-1104
<Non-Patent Document 2> Visible-Light-Induced Living Radical Polymerization (LRP) Mediated by (salen)Co(II)/TPO at Ambient Temperature, Macromolecules, 2015, vol. 48, p 5132-5139

SUMMARY OF THE INVENTION

According to the above problems, an object of the present invention is to provide a polymer preparing method that is low-toxic, environmental-friendly, highly controllable, and low cost to obtain polymers with high molecular weight. In addition, another object of the present invention is to provide a control agent and a composition for the controlled radical polymerization of the preparing method.

To achieve the above objects, the present invention provides a preparing method of the polymer comprises conducting a controlled radical polymerization process of monomer (Y). In the controlled radical polymerization process, the organic compound (A), which has the formula (I), the structure of formula (I) is shown as

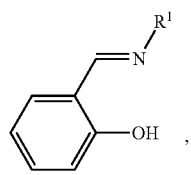

(I)

and radical initiator (B) are existing in a mole ratio (B/A) range from 0.5 to 25.

In formula (I), $R^1$ is hydrogen atom, alkyl group, aryl group or hydroxyl group, the alkyl group can be alkyl having substituent or alkyl substituent, and the aryl group can be aryl having substituent or aryl substituent.

It is preferred that $R^1$ is an alkyl group or aryl group. It's more preferred that $R^1$ is an alkyl group or aryl group with a substituent having formula (II), the structure of formula (II) is shown as

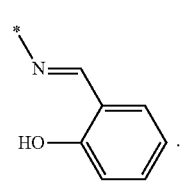

(II)

In formula (II), * is bonding end to the alkyl group or the aryl group.

It is preferred that the organic compound (A) has structure of formula (III), the structure of formula (III) is shown as

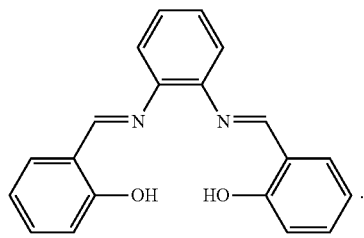

(III)

In the preparing method, it is preferred that the mole ratio (Y/A) of the monomer (Y) to the organic compound (A) ranges from 300 to 30000.

In the polymer preparing method of the present invention, the preferred monomer (Y) is vinyl acetate. In this case, after the controlled radical polymerization process of the vinyl acetate to obtain poly(vinyl acetate), the method further comprises a step of saponifying the poly(vinyl acetate) to poly(vinyl alcohol).

To achieve above objects, the present invention provides a composition for the radical polymerization process. The composition includes the mentioned organic compound (A) and the radical initiator (B) existing in a mole ratio (B/A) ranging from 0.5 to 25. The organic compound (A) has the formula (I), the structure of formula (I) is shown as

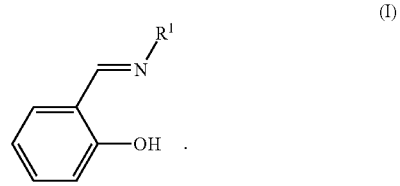

(I)

In formula (I), $R^1$ represents a hydrogen atom, alkyl group, aryl group or hydroxyl group, the alkyl group can be alkyl having substituent or alkyl substituent, and the aryl group can be aryl having substituent or aryl substituent.

The composition can further include the monomer (Y) existing in a mole ratio (Y/A) ranging from 300 to 30000.

To achieve the above objects, the present invention provides organic compound (A) as the control agent of radical polymerization with a structure of the formula (I), the structure of formula (I) is shown as

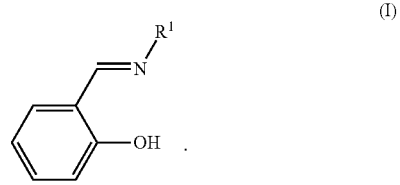

(I)

In formula (I), $R^1$ represents a hydrogen atom, alkyl group, aryl group, or hydroxyl group, the alkyl group can be alkyl having substituents or alkyl substituent, and the aryl group can be aryl having substituents or aryl substituent.

The organic compound (A) according to the present invention has higher safety, better capability to control the polymerization, and lower cost. Thus, the preparing method can precisely control molecular arrangement and chain-end structures to synthesize polymers with high molecular weight and high safety. In addition, the preparing method of the present invention is friendly to the environment due to the low toxicity, and it is low-cost due to no need of removing process for the organic compound (A). The composition for radical polymerization and the radical polymerization control agent of the present invention are also suitable for the preparing method of the polymers.

BRIEF DESCRIPTION OF THE DRAWINGS

The sole FIGURE is a distribution graph of number-average molecular weight (Mn) to the conversion of vinyl acetate in embodiment 1 of the present invention.

DETAILED DESCRIPTION OF THE PREFERRED EMBODIMENT

The advantages and characteristics of the present invention and the way to achieve the purpose of the present invention will be easily understood by referring to the exemplary embodiments and the drawings. However, the present invention can be embodied by different forms and should not be understood that the embodiments herein are limited to the present invention. On the contrary, for persons ordinarily skilled in the art, the provided embodiments will express the scope of the present invention more thoroughly, more wholly, and more completely.

The present invention is about a preparing method of polymers. The preparing method includes a controlled radical polymerization process of monomer (Y). In the controlled radical polymerization process, organic compound (A), which has the formula (I), the structure of formula (I) is shown as

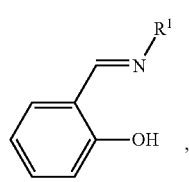

(I)

and radical initiator (B) are existing in a mole ratio (B/A) ranging from 0.5 to 25.

In formula (I), $R^1$ is a hydrogen atom, alkyl group, aryl group, or hydroxyl group, the alkyl group can be alkyl having substituents or alkyl substituent, and the aryl group can be aryl having substituents or aryl substituent.

In the polymerization process, when the organic compound (A) and the radical initiator (B) exist, the polymer can be obtained by controlled radical polymerization of the monomer (Y). The controlled radical polymerization of the preparing method of the present invention is a polymerization reaction at the equilibrium stage between the propagating radicals on the chain-end (i.e., active end) of the polymer and the species (i.e., dormant species) having a covalent bond with the control agent. According to the preparing method of the present invention, the organic compound (A) is used as the control agent. The radical polymerization can be highly controlled due to using the organic compound (A). High molecular weight polymer can be obtained by precisely controlling the molecular arrangement and the chain-end structures. In addition, the organic compound (A) is cheaper than conventional control agents, and the organic compound (A) is safer because it does not include harmful materials such as halogen atoms, sulfur atoms, or metals. So that in the preparing method, a removing process of the organic compound (A) is unnecessary. Thus, the preparing method of the present invention is environmental-friendly and low-cost.

In formula (I), $R^1$ is a hydrogen atom, alkyl group, aryl group, or hydroxyl group, the alkyl group can be alkyl having substituents or alkyl substituent, and the aryl group can be aryl having substituents or aryl substituent. It is preferred that $R^1$ is an alkyl group or aryl group, and more preferred is an aryl group.

The number of carbon atoms of the alkyl group (including the substituent) is preferred from 1 to 20, more preferred is lower than 18, such more preferred is lower than 14, very preferred is lower than 12 and extremely preferred is lower than 10. The alkyl group can include the linear chain, branched chain, or cycloalkanes with a ring structure. For example, the alkyl group can be methyl group, ethyl group, n-propyl group, isopropyl group, n-butyl group, isobutyl group, sec-butyl group, tert-butyl group, n-pentyl group, isopentyl group, neopentyl group, tert-pentyl group, n-hexyl group, isohexyl group, 2-ethylhexyl group, n-heptyl group, n-octyl group, n-nonyl group, n-decyl group or the like which includes linear chain or branched chain. The aryl group can also be cyclopropyl group, cyclobutyl group, cyclopentyl group, cyclohexyl group, cyclopentyl group, cyclooctyl group, cyclononyl group, cyclodecyl group, or the like which has cycloalkyl group. Among the above-mentioned alkyl groups, the methyl group, the ethyl group, the n-propyl group, the isopropyl group, the n-butyl group, the isobutyl group, the sec-butyl group, and the tert-butyl group are preferable, the methyl group and the ethyl group are more preferable, and the ethyl group is the most preferable.

The alkyl group can also have substituents which will not impede to the effectiveness of the present invention. For example, the substituents can be alkoxy group, amino group, carboxyl group, ester group, silyl group, sulfhydryl group, cyano group, nitro group, sulfo group, formyl group, aryl group, halogen atom, hydroxyl group, ether group, alkenyl group or the like. Among the above-mentioned substituents, the amino group is preferable due to the better stability of radicals. The more preferable amino group has the formula (II). The alkyl group is more preferable to have amino group having the formula (II). For better environment and safety, the alkyl group is suitable for not including substituents instead of the amino group represented with formula (II), the structure of formula (II) is shown as

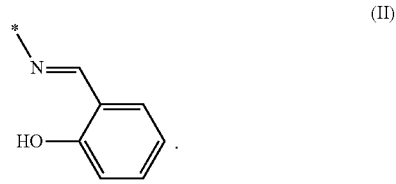 [SMILES: */N=C/c1ccccc1O]

(II)

In formula (II), ✱ is the bonding end to the aryl group. In view of cost, the alkyl group is preferred to be phenyl without substituent.

When $R^1$ represented of formula (II) is an alkyl group with a substituent, a more suitable structure of the organic compound (A) is represented in formula (IV), the structure of formula (IV) is shown as

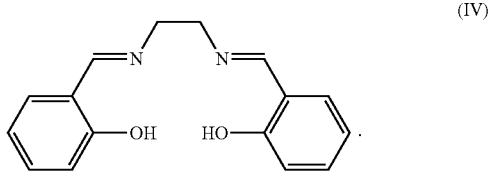 [SMILES: Oc1ccccc1/C=N/CC/N=C/c1ccccc1O]

(IV)

The number of carbon atoms of the aryl group (with the substituent) used as $R^1$ is suitable for the range from 6 to 25, more suitable for lower than 20, such more suitable for lower than 18 and very suitable for lower than 15. The aryl group can be phenyl group, biphenyl group, naphthyl group, anthryl group, indenyl group, fluorenyl group, phenanthryl group, indacenyl group, phenalenyl group, azulenyl group, pyridyl group, furyl group or the like, wherein phenyl group is more suitable. The aryl group can also have substituent which will not impede to the effectiveness of the present invention. The position of the substituent in the aryl group is not restricted. The preferable position is ortho position or para position for radical stability when the aryl group is a phenyl group. For such a substituent, the substituent used for $R^1$ of the alkyl group has been stated above. The substituent is suitable for including the amino group due to radical stability, and the amino group which has the formula (II) is more suitable. The aryl group is suitable for including the amino group, and the amino group which has the formula (II) is more suitable. For better environment and safety, the aryl group is suitable for not including substituents instead of the amino group which has the formula (II), the structure of formula (II) is shown as

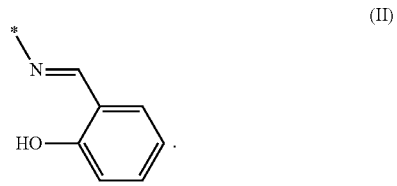 [SMILES: */N=C/c1ccccc1O]

(II)

For a better cost, $R^1$ is suitable for including the phenyl group instead of the substituents.

In formula (II), * means a bonding end for forming a bond with the alkyl group.

When $R^1$ represented with formula (II) is included with the aryl group, a more suitable structure of the organic compound (A) is represented in the formula (III), the structure of formula (III) is shown as

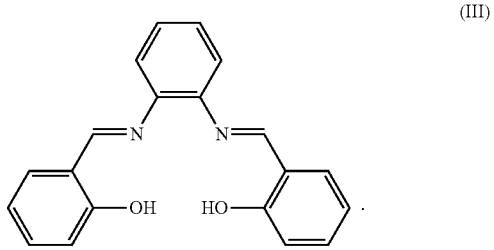 [SMILES: Oc1ccccc1/C=N/c1ccccc1/N=C/c1ccccc1O]

(III)

So that the organic compound (A) is preferred a structure which is complementary to the aryl group and extended through the amino group.

For the radical initiator (B) of the polymerization process, the radical initiator (B) is azo radical initiator, peroxide radical initiator, or reduction-oxidation radical initiator in the related art. The azo radical initiator is enumerated such as 2-2'-azobisisobutyronitrile, 2,2'-azodi(2,4-dimethylvaleronitrile) or 2,2'-azobis(4-methoxy-2,4-dimethylpentanenitrile), etc. The peroxide radical initiator is enumerated as percarbonate compounds such as diisopropyl peroxydicarbonate, di-(2-ethylhexyl)peroxydicarbonate, or diethoxyethyl peroxydicarbonate; perester compounds such as tert-butyl peroxyneodecanoate, α-cumyl peroxyneodecanoate, tert-butyl peroxyneodecanoate, acetyl cyclohexanesulfonyl peroxide, diisobutyryl peroxide, or 2,4,4-trimethyl pentyl-2-peroxy phenoxy acetate. Besides, the radical initiator can also be the peroxide composition of potassium persulfate, ammonium persulfate, and hydrogen peroxide. In addition, for the reduction-oxidation radical initiator, a composition is enumerated as the peroxide compounds described above and the reducing agents such as sodium bisulfite, sodium bicarbonate, tartaric acid, L-ascorbic acid, or rongalite.

The polymerization process is enumerated in the related art such as bulk polymerization, solution polymerization, suspension polymerization, and emulsion polymerization. Among these processes, the bulk polymerization used in a non-solvent environment to polymerize, and the solution polymerization used in every kind of solvent to polymerize are more often to adopted. The bulk polymerization not including solvents or dispersion medium, which will cause the side reactions such as chain transfer reaction, is preferred to restrain the decline of propagation rate of the chain-end radicals caused by the chain transfer reaction. On the other hand, sometimes solution polymerization is also preferred considering the tuning of viscosity of the solution and the controlling of polymerization rate. The organic solvent used as the solvent of the solution polymerization is enumerated as the esters such as methyl acetate or ethyl acetate, the hydrocarbons such as benzene or toluene, and the low alcohol such as methanol or ethanol. Among the above solvents, the preferred solvent is esters and aromatic hydrocarbons due to the prevention of chain transfer. Besides, when the monomer (Y) includes vinyl acetate, methanol is also preferred as the solvent of polymerization while the completeness of the process has been considered because the requirement of basic treatment in methanol after the polymerization increases. The quantity of the solvent can be decided by the expected number-average molecular weight of the polymer and the viscosity of the reaction solution, for example, the mass ratio (solvent/monomer (Y)) can be selected in a range of 0.01 to 10.

In the controlled radical polymerization of the present invention, at first, radicals dissociated from the radical initiator (B) combine with a few monomers (Y) to form the short-chain polymers with propagating radical chain-end. The organic compound (A) is covalently bonded with the end of the polymer to form dormant species. In a short time after the reaction started, only a few short-chain polymers are produced and converted to dormant species instead of polymerized rapidly. This period is called the induction period. When the organic compound (A) is exhausted, the reaction begins the growing period for the increase of molecular weight of the polymers, in which the molecular weights of the polymer chains in the whole reaction system are increased proportionally to the polymerization time. The time required for the polymerization process of the monomer (Y) is the sum of the induction period and the growing period, which is usually ranged from 0.5 to 30 hours.

According to the above description, each molecule of the organic compound (A) added into the reaction theoretically can form a polymer chain in the controlled radical polymerization of the present invention. Thus, the quantity of the organic compound (A) added into the reaction solution is decided by the desired number-average molecular weight and the conversion. For the desired polymer obtained after the polymerization process with high molecular weight, the ratio of the monomer (Y) to the organic compound (A) is preferred to above 300, more preferred to above 1000, such more preferred to above 2000, very preferred to above 4000, and extremely preferred to above 6000. In addition, for raising the living rate of the chain-end propagating radicals, a mole ratio (Y/A) is preferred to below 30000, more preferred to below 25000, and further preferred to below 20000. When the addition of the organic compound (A) and the monomer (Y) is divided into several times, the mole ratio (Y/A) should be calculated according to the quantity added each time.

In the polymerization process, the mole ratio (B/A) of the radical initiator (B) to organic compound (A) is ranged from 0.5 to 25. When the mole of the radicals is less than the mole of the organic compound (A), the polymerization process will be only performed on a mechanism in which the organic compound (A) is dissociated from the dormant species by heating, thus, the polymerization rate will be extremely low depending on the reaction temperature. Therefore, considering each of the radical initiator (B) can initiate two radicals, the ratio (B/A) of the radical initiator (B) to the organic compound (A) must be over 0.5 when the organic compound (A) and the radical initiator (B) are added into the reaction solution in the polymerization process. Because the amount of the active radicals provided by the general radical initiators actually depends on the efficiency of the radical initiator (i.e., initiation efficiency of the initiator), there are indeed initiators that are inactive and not used to form the dormant species. Consequently, the mole ratio from (B) to (A) is preferred over 0.6, and more preferred over 0.8. On the other hand, if the mole of the initiated radicals is much larger than that of the organic compound (A), the controllability of the polymerization becomes lower due to the ratio of uncontrolled radical increases. The mole ratio from (B) to (A) is preferred under 15, more preferred under 10, and further preferred under 5. When the addition of the organic compound (A) and the radical initiator (B) is divided into several times, the mole ratio (B/A) should be calculated according to the quantity added each time.

From the aspects of the environment, safety, and cost, the mole ratio (transitional metal/A) of the transitional metal and the organic compound (A) is preferred under 0.1, more preferred under 0.01 in the polymerization process, and further preferred to adjust the monomer (Y) to tune the polymerization while the organic compound (A) will not form the complex so that performs better controllability for the polymerization.

The variety of the monomer (Y) for the polymerization process is not limited to specific monomers as long as the monomer (Y) can be polymerized via the radical pathway. The monomer (Y) is preferred to alkenes such as ethylene, propene or isobutylene; alkenes halides such as vinyl chloride, vinyl fluoride, 1,1-dichloroethene or 1,1-difuoroethene; vinyl esters such as vinyl formate, vinyl acetate, vinyl trifluoroacetate, vinyl propionate, vinyl pentanoate, vinyl butyrate, vinyl isobutyrate, vinyl 2,2-dimethylpropanoate, vinyl decanoate, vinyl laurate, vinyl stearate, vinyl benzoate or vinyl neodecanoate; acrylic acid; methacrylic acid; acrylates such as methyl acrylate, ethyl acrylate, n-propyl acrylate, isopropyl acrylate, n-butyl acrylate, isobutyl acrylate, tert-butyl acrylate, 2-ethylhexyl acrylate, dodecyl methacrylate or octadecyl acrylate; methyl acrylates such as methyl methacrylate, ethyl methacrylate, butyl methacrylate, 2-ethylhexyl methacrylate, lauryl methacrylate or 2-hydroxyethyl methacrylate; quaternary compounds such as dimethylaminoethyl acrylate or 2-(dimethylamino)ethyl methacrylate monomers such as acrylamide, n-methylol acrylamide, n,n-dimethylacrylamide, 2-acrylamido-2-methylpropanesulfonic acid-acrylic acid or the sodium salt thereof, acrylamide monomers such as, methacrylamide, n,n-dimethylacrylamide or methacrylamidopropyltrimonium chloride; styrene monomers such as styrene, alpha-methylstyrene, p-styrenesulfone or the sodium salt, potassium salt thereof, n-vinylamine monomers such as n-vinylpyrrolidone, n-vinylformamide, n-vinylacetamide or n-vinyl-epsilon-caprolactam; allyl monomers such as allyl acetate, allyl chloride, allyl alcohol or methallyl alcohol; acrylonitrile monomers such as acrylonitrile or methacrylonitrile; vinyl ether monomers such as alkyl vinyl ether (number of carbon atoms ranges from 1 to 18), hydroxyalkyl vinyl ether or alkoxyalkyl vinyl ether; dicarboxylic acid monomers such as maleic acid, maleic acid monomethyl ester, maleic anhydride, itaconic acid, itaconic acid monomethyl ester, dimethyl itaconate or itaconic anhydride, in which vinyl ester, alkene, acrylic acid, acrylate and n-vinylamine monomers are more preferred, and vinyl ester and n-vinylamine monomers are further preferred. The monomer (Y) can include at least one of the above or more than two. The monomer (Y) is preferred to select one of these monomers as the main ingredient. Moreover, the main ingredient means the monomer (Y) having the highest content among all monomers. The main ingredient of the monomers in the monomer (Y) is preferred over 30 mol %, more preferred over 50%, further preferred over 70%, and extremely preferred over 80%.

For the vinyl ester described above, vinyl acetate is preferred from the economic viewpoint. For the vinylamine monomers described above, n-vinylpyrrolidone is preferred from the economic viewpoint.

About the preparing method of the present invention, for the monomer (Y), it can be used to obtain homopolymer with single type of monomer and also copolymer with more than two types of monomers. In addition, the polymer obtained by the preparing method of the present invention can be any kind of linear chain or branched chain, in which the linear chain is preferred when the high polymerization controllability of the organic compound (A) is activated.

As long as the dormant species can be formed and the molecular weight of the polymer can be controlled, the method of mixing the organic compound (A), radical initiator (B), and monomer (Y) is not limited. For example, with regards to the monomer (Y), the methods of adding the organic compound (A) and the radical initiator (B) are enumerated such as mixing the organic compound (A) and the radical initiator (B) first, then the mixture is mixed with the monomer (Y); also the organic compound (A), the radical initiator (B), and the monomer (Y) can be mixed at one-time; or the organic compound (A) and the monomer (Y) are mixed at first, then the mixture is mixed with the radical initiator (B). In addition, the organic compound (A), the radical initiator (B), and the monomer (Y) can also be mixed as several separated parts. For example, the organic compound (A) and the radical initiator (B) are mixed with part of the monomer (Y) separately, once the organic compound (A) and the chain-end of the short-chain polymer are bonded covalently to form the dormant species, the dormant species is further mixed with the remained monomer (Y) to perform a polymerization reaction with the monomer. Furthermore, the dormant species can also be isolated and then used as the macroinitiator that is mixed with the remained monomer (Y) to conduct the polymerization.

The polymerization temperature is preferred in 0° C. to 80° C. When the polymerization temperature is lower than 0° C., the production will be declined due to the insufficient polymerization rate. Therein, the preferred polymerization temperature is higher than 10° C., and a more preferred polymerization temperature is higher than 20° C. On the other hand, when the polymerization temperature is over 80° C., the controllability of the radical polymerization will be decreased. Therein, the preferred polymerization temperature is lower than 70° C., and a more preferred polymerization temperature is lower than 65° C.

From a viewpoint of increasing the controllability of the radical polymerization, when the conversion of the monomer (Y) is 5%, a ratio (Mn/theoretical Mn) of a number-average molecular weight (Mn) (measured value) to a theoretical number-average molecular weight (theoretical Mn) is preferred to under 20.0, more preferred to under 5.0, and further preferred to under 3.0. In addition, from a viewpoint of production, when the conversion of the monomer (Y) is 5%, the ratio (Mn/theoretical Mn) is preferred to over 0.5, and more preferred to over 0.8. The conversion of the monomer (Y) is not limited and ranged from 3% to 70% which can be adjusted according to the quantity of the organic compound (A) and the monomer (Y) added into the polymerization, or the targeted number-average molecular weight. The conversion described above is preferred to over 10%, and more preferred to over 20%. On the other hand, the conversion described above is preferred to be under 50%. When a desired number-average molecular weight (Mn) (measured value) is required to be calculated while the conversion of the polymer is 5.0%, the method of calculation is described below. The measurements needed to be performed several times from the start of the polymerization until the end of the polymerization (measuring at least one time when the conversion is ranged from 1.0 to 13.0), and using GPC (Gel Permeation Chromatography) data of the polymer to calculate the number-average molecular weight (Mn) according to several conversions. Then drawing a dispersion graph of the number-average molecular weight (Mn) versus the conversion and calculating the number-average molecular weight (Mn) of the polymer at the 5% conversion by the line passing through two points that are nearest to the 5% conversion. Noteworthily, this method is suitable only when at least one of the two points is ranged from 1.0% to 13.0%. Specifically, the calculating method is adopted in the embodiments described below. The theoretical number-average molecular weight is calculated by the formula described below.

theoretical Mn=the ratio (Y/A) of the monomer (Y) to the organic compound (A)*average molecular weight of the monomer (Y) [g/mol]*(conversion [%]/100)

In order to properly use the high controllability of the preparing method in the present invention, for the polymerization process described above, the production of block copolymers is preferred. Specifically, for the polymerization process described above, when the organic compound (A) and the radical initiator (B) exist, controlled polymerization of monomer (Ya) and monomer (Yb) other than monomer (Ya) are sequentially performed, the block copolymer with the block (a) composed by the monomer (Ya) and the block (b) composed by monomer (Yb) is the preferred product. For the monomer (Ya) and the monomer (Yb), the suitable monomers (Y) have been enumerated above.

For the polymerization process described above, when the number-average molecular weight and conversion of the monomer (Y) are achieved to the targeted values, a polymerization termination agent can be added to terminate the polymerization process. For the polymerization termination agent, hydroxyl aromatic compounds are enumerated such as 1,1-diphenylethylene, mequinol, hydroquinone, cresol, 4-tert-butylcatechol or p-nitrophenol; quinone compounds such as benzoquinone or naphthoquinone; conjugated carbonic acids such as muconic acid or sorbic acid; sulfides such as phenothiazine, distearyl thiodipropionate or dilauryl thiodipropionate; aromatic amines such as p-phenylenediamine or n-nitrosodiphenylamine; nitrogen oxides such as 2,2,6,6-tetramethylpiperidine-1-oxyl (TEMPO) or 4-hydroxy-2,2,6,6-tetramethylpiperidin-1-oxyl (TEMPOL); transitional metal salts such as copper(II) acetate, copper(II) diethyldithiocarbamate or manganese(II) acetate. Therein, 2,2,6,6-tetramethylpiperidine-1-oxyl, hydroquinone, 1,1-diphenylethylene, sorbic acid, and benzoquinone are preferred.

The mole of the polymerization termination agent added into the polymerization is preferred from 1 mol to 100 mol. If the mole number of the polymerization termination agent is too low, the radicals at the chain-ends of the polymer can't be captured completely, so the colors of the polymeric product may deteriorate. In contrast, if the mole number of the added polymerization termination agent is too high, the risks of the increasing cost will occur.

The temperature of the reaction solution, which is the temperature that the polymerization termination agents can react with the chain-end radicals, is preferred from 0° C. to 80° C. The time needed for the termination process is usually in 1 hour to 5 hours.

After the polymerization process, considering the merits of environment, safety, and cost, it is preferred not to perform a purification process except to perform the purification process for the obtained polymer to remove the organic compound (A) and other impurities. The obtained polymer has high safety even without the purification process due to the high safety of the organic compound (A).

As described above, the preferred monomer (Y) used in the polymerization process is a vinyl ester. In other words, for the polymerization process described above, when the organic compound (A) and the monomer (Y) exist, it is preferred to perform the controlled radical polymerization of vinyl ester to produce the vinyl ester polymers. For the vinyl ester polymers described above, a homopolymer of vinyl ester, a random polymer including vinyl ester unit and monomer other than a vinyl ester, and a vinyl ester block copolymer constructed by block (a) including the vinyl ester units and block (b) including the other monomers are enumerated. The obtained vinyl ester polymer can be used for a plurality of purposes.

In addition, it is preferred to obtain vinyl alcohol polymers by saponification process, in which the vinyl ester unit can be converted to vinyl alcohol after the vinyl ester polymer is saponified.

For the saponification process, the vinyl alcohol polymer is obtained by saponification in which the vinyl ester polymer is dissolved in ethanol. When acrylic units are included in the vinyl ester polymer, the acrylic units can be transformed into acrylic acid units by the saponification with proper tuning of the condition. In addition, the acrylic units or the acrylic acid units can be transformed to lactone with the adjacent vinyl alcohol units.

For the alcohols used in the saponification reaction, low alcohols such as methanol and ethanol are enumerated, in which methanol is preferred. In addition, the alcohols described above can be hydrous alcohols or dehydrated alcohols. The alcohols used in the saponification reaction can also be included in acetone, esters such as methyl acetate or ethyl acetate, or solvents such as toluene. The catalyst used in the saponification reaction is enumerated as hydroxide compounds such as potassium hydroxide or sodium hydroxide; basic catalysts such as sodium methoxide; acidic catalysts such as inorganic acid. The temperature of the saponification reaction is preferred from 20° C. to 80° C. When the gel product is deposited during the saponification reaction, the gel product can be smashed, washed, and then dried to obtain vinyl alcohol polymers.

The degrees of saponification of the vinyl alcohol polymers mentioned above can be adjusted according to the applications of polymers and is not limited, usually ranged from 50 mol % to 99.99 mol %. For the present invention, the degree of saponification is a ratio of the mole number of the vinyl alcohol unit to a sum of the mole number of the vinyl ester unit and the vinyl alcohol unit in the vinyl ester polymers. The degree of saponification can be measured by $^1$H-NMR of the vinyl alcohol polymers.

The ratio of the vinyl alcohol unit to the sum of the vinyl ester unit and the vinyl alcohol unit is preferred to over 50 mol %, more preferred to over 70 mol %, and further preferred to over 80 mol %.

The number-average molecular weight (Mn) of the polymers prepared by the preparing method of the present invention is not limited, which is preferred to over 1,000. According to the preparing method of the present invention, polymer with high molecular weight can be synthesized by precisely adjusting the molecule arrangement and the chain-end structure. Thus, the preparing method provided by the present invention is suitable for producing the polymer with a high number-average molecular weight (Mn). The number-average molecular weight (Mn) of the polymer described above is preferred to be more than 2,000, more preferred to be more than 4,000, further preferred to be more than 10,000, much more preferred to be more than 20,000, and extremely preferred to be more than 40,000. In addition, from a viewpoint of the ease of the treatment, the number-average molecular weight (Mn) of the polymer is preferred to be less than 1,000,000, more preferred to be less than 500,000, and further preferred to be less than 300,000. The number-average molecular weight (Mn) and polydispersity index (Mw/Mn) can be measured by the GPC method in which the poly(methyl methacrylate) is used as a standard material. For a column, tetrahydrofuran (THF) column and hexafluoroisopropanol (HFIP) column are preferred due to the factors such as solubility of the polymer as a solute. The specific method of measurement is described in embodiments.

The polydispersity index (Mw/Mn) of the polymers obtained by the preparing method of the present invention is not limited and is preferred from 1.0 to 6.0. A narrow polydispersity index (Mw/Mn) of the polymer can be obtained by adjusting the radical polymerization. The polydispersity index (Mw/Mn) is preferred to be less than 3.0, more preferred to be less than 2.0, and further preferred to be less than 1.8.

The radical polymerization can be highly adjustable due to the organic compound (A) used in the preparing method provided by the present invention. Moreover, the organic compound (A) is cheaper than the conventional control agents, with higher safety due to no toxic materials such as halogen atoms, sulfur atoms, or metals, and does not need the purification process to remove the organic compound (A). Therefore, the preparing method provided by the present invention is friendly to the environment and has predominance on the cost. The obtained polymer can be applied to health, household goods, architecture, civil, industry, agriculture, healthcare, or food depending on its properties.

A preferred embodiment of the present invention is a composition for radical polymerization including an organic compound (A) which has the formula (I), the structure of formula (I) is shown as

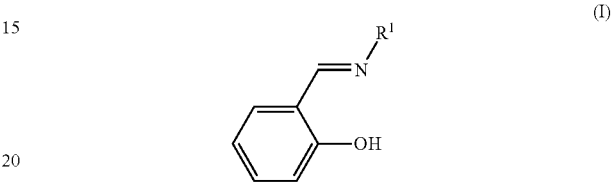

and a radical initiator (B), in which $R^1$ is a hydrogen atom, alkyl group, aryl group, or hydroxyl group, the alkyl group can be alkyl having substituents or alkyl substituent, and the aryl group can be aryl having substituents or aryl substituent, and the mole ratio of (B) to (A) is ranged from 0.5 to 25. When using the composition, the radical polymerization of a monomer (Y) can be performed because high controllability can be achieved. In addition, the composition has high safety. Thus, starting from the preparing method mentioned above, the composition can be suitable for the radical polymerization of a wide variety of monomers. The organic compound (A), the radical initiator (B), and the monomer (Y) used as the composition of the radical polymerization described above, the examples of preparing method for polymers have been described above.

In the composition of the radical polymerization described above, the one including the monomer (Y) is preferred. At this moment, a mole ratio (Y/A) of the monomer (Y) to the organic compound (A) is preferred from 300 to 30000.

A radical polymerization control agent includes the organic compound (A) with the formula (I) is the preferred embodiment of the present invention, the structure of formula (I) is shown as

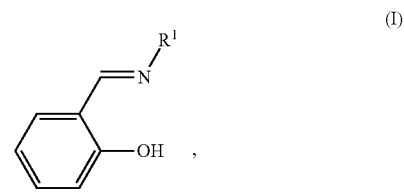

in which $R^1$ is a hydrogen atom, alkyl group, aryl group, or hydroxyl group, the alkyl group can be alkyl having substituents or alkyl substituent, and the aryl group can be aryl having substituents or aryl substituent. For the organic compound (A) as the radical polymerization control agent mentioned above, the preparing method of the polymer has been described above. When the radical polymerization proceeds, for the radical initiator (B) and the monomer (Y), the preparing method of the polymer has been described above.

The embodiments of the present invention described below will have more detailed interpretations.

Organic Compound (A)
  n,n'-disalicylal-1,2-phenylenediamine (salophen category, the organic compound (A) represented in formula (III))
  salicylideneaniline (the organic compound (A) represented as formula (I), in which $R^1$ is an aryl group without substituent)
  n,n'-bis(salicylidene)-1,-2-ethylenediamine (salen, the organic compound (A) represented in formula (IV))
  2-hydroxy acetophenone
  salicylamide
  glyoxalbis(2-hydroxyanil)
Radical Initiator (B)
  2,2'-azobis (4-methoxy-2,4-dimethylvaleronitrile) (V70)
  azobisisobutyronitrile (AIBN)
Monomer (Y)
  vinyl acetate (VAc)
  n-vinyl pyrrolidone (VP)
Polymerization Termination Agent
  2,2,6,6-tetramethylpiperidine-1-oxyl (TEMPO)
  hydroquinone (HQ)
  1,1-diphenylethylene (DPEt)
Number-Average Molecular Weight (Mn)
  Using a gel permeation chromatography instrument manufactured by Shimadzu K.K. to measure the number-average molecular weight (Mn) and the polydispersity index (Mw/Mn) of the polymers. One of the conditions listed below can be selected as the condition for the measurement.
Condition 1
  Column: tetrahydrofuran column [KF-806F] manufactured by Showa Denko K.K.
  Standard reagent: poly(methyl methacrylate)
  Solute and mobile phase: tetrahydrofuran (THF)
  Flow rate: 1.0 mL/min
  Temperature: 40° C.
  Concentration of reagent solution: 0.2 mass % (filtrated by a mesh with a diameter of 0.45 μm)
  Filling amount: 100 μL
  Measuring device: RI
Condition 2
  Column: 2 HFIP columns [GMHHR-H(S)] manufactured by Tosoh K.K. linearly connected
  Standard reagent: poly(methyl methacrylate)
  Solute and mobile phase: sodium trifluoroacetate-HFIP solution (with concentration 20 mM)
  Flow rate: 0.2 mL/min
  Temperature: 40° C.
  Concentration of reagent solution: 0.1 wt % (filtrated by a mesh with a diameter of 0.45 μm)
  Filling amount: 10 μL
  Measuring device: RI
Theoretical Number-Average Molecular Weight
  The theoretical number-average molecular weight (theoretical Mn) at a specific conversion can be calculated by the following formula: theoretical Mn=a molar ratio (Y/A) of monomer (Y) to organic compound (A)*average molecular weight [g/mol] of the monomer (Y)*(conversion [%]/100).
Controllability of Polymerization
  When the conversion of monomer (Y) is 5%, a ratio of the number-average molecular weight (Mn) (measured value) to the theoretical number-average molecular weight (theoretical Mn) is less than 20.0. When the Mn is increased with the increase of the conversion, it can be judged as excellent controllability. The number-average molecular weight (Mn) (measured value) of the polymer can be calculated by the following method when the conversion described above is 5%. The measurements needed to be performed several times from the start of the polymerization until the end of the polymerization (measuring at least one time when the conversion is ranged from 1.0 to 13.0), and using GPC (Gel Permeation Chromatography) data of the polymer to calculate the number-average molecular weight (Mn) according to several conversions. The sole FIGURE is a distribution graph of number-average molecular weight (Mn) versus the conversion of vinyl acetate in embodiment 1 of the present invention. As shown in the sole FIGURE, after the graph of the conversion (horizontal axis, linear scale) versus the number-average molecular weight (longitude axis, linear scale) was plotted, the number-average molecular weight (Mn) of the polymer at the 5% conversion can be calculated by the line passing through two points that are nearest to the 5% conversion. Noteworthily, this method is suitable only when at least one of the two points is ranged from 1.0% to 13.0%.

Embodiment 1

<Polymerization Process>

Adding 900 mass units of VAc into a reactor with an agitator, a reflux condenser, and a valve for the injection of the initiator, and introducing nitrogen gas into the reactor in order to change the atmosphere by the inactive gas. Adding 100 mass units of VAc, 3.67 mass units of salophen used as the organic compound (A), and 10.74 mass units of V-70 used as the radical initiator (B) into a container for the modulation and introducing nitrogen gas to change the atmosphere by the inactive gas environment after all reagents are dissolved. Transfer the solution in the modulation container to the reactor and heat the solution to 45° C. with the agitation. Properly prepare the samples and confirm the concentration of the solid substances in the solution during the polymerization. At the time when a conversion of VAc reaches 4.4 mass %, the number-average molecular weight (Mn) is 17,500, the theoretical number-average molecular weight (theoretical Mn) is 3,800 and the ratio (Mn/theoretical Mn) is 4.6. At a time when the conversion of VAc reaches 7.7 mass %, the number-average molecular weight (Mn) is 18,300, the theoretical number-average molecular weight (ideal Mn) is 6,600 and the ratio (Mn/theoretical Mn) is 2.8. At a time when the conversion of VAc reaches 10.5 mass %, the number-average molecular weight (Mn) is 19,100, the theoretical number-average molecular weight (theoretical Mn) is 9,100 and the ratio (Mn/theoretical Mn) is 2.1. Adding 9.07 mass units of TEMPO as the termination agent at the time when the conversion of VAc reaches 15.7 mass %. At this time, the number-average molecular weight (Mn) is 21,000, the ideal number-average molecular weight (ideal Mn) is 13,600, the ratio (Mn/theoretical Mn) is 1.5 and the polydispersity index (Mw/Mn) is 1.77. Distilling the solution to remove the unreacted VAc in order to recycle the vinyl acetate and dry the polymers in the vacuum drier for 24 hours at 40° C. to obtain the poly(vinyl acetate). The polymerization process described above is represented in table 1 with the details. The sole FIGURE is the distribution graph of the number-average molecular weight versus the conversion of VAc. According to the sole FIGURE, when the conversion rate of VAc is 5.0%, the ratio (Mn/theoretical Mn) of the number-average molecular weight (Mn) (measured value) to the theoretical number-average molecular weight (theoretical Mn) is 4.3.

Embodiment 2

<Polymerization Process>

Adding 0.46 mass units of salophen as the organic compound (A), 0.45 mass units of V-70, and 0.80 mass units of HQ as the polymerization termination agent, other conditions are the same as Embodiment 1, and the same polymerization process is performed. After adding the polymerization termination agent, connecting the reactor to vacuum tubes and removing the unreacted VAc by co-boiling with the addition of methanol, to obtain a methanol solution with poly(vinyl acetate). The detail is shown in table 1.

<Saponification Process>

Next, modifying the concentration of the obtained methanol solution to 100 mass units of poly(vinyl acetate) and 1834 mass units of methanol in the same reactor described above, and then heating and agitating until the inner temperature reaches 40° C. At this time, adding 66.4 mass units of sodium hydroxide methanol solution (the concentration is 47 mass % and 9.3 mass units of sodium hydroxide). Performing the saponification reaction of the methanol solution with 5 mass % poly(vinyl acetate) at 65° C. for 1 hour. Removing liquids and adding phenolphthalein liquid into the cleaning fluid (methanol), and then cleaning the product with methanol to remove sodium hydroxide and sodium acetate until basicity disappears. The solids are dehydrated by centrifuge and then dried in a vacuum desiccator at 40° C. for 24 hours, to obtain white poly(vinyl alcohol). Saponification degree is 99.9%.

Embodiment 3

<Polymerization Process>

Adding 7.35 mass units of salophen as the organic compound (A) and 76.28 mass units of AIBN as the radical initiator (B), heating the reactor until the inner temperature reaches 60° C. and then adding 18.14 mass units of TEMPO as the polymerization termination agent. Other conditions are the same as Embodiment 1 and performing the same polymerization reaction, to obtain poly(vinyl acetate). The detail is shown in table 1.

Embodiment 4

<Polymerization Process>

Adding 1000 mass units of VP as the monomer, 5.69 mass units salophen as the organic compound (A), and 29.55 mass units AIBN as the radical initiator (B), heating the reactor until the inner temperature reaches 60° C. and then adding 18.14 mass units of TEMPO as the polymerization termination agent. Other conditions are the same as Embodiment 1 and performing the same polymerization reaction, to obtain poly(vinyl pyrrolidone). The detail is shown in table 1.

Embodiment 5

<Polymerization Process>

Adding 2.29 mass units of n-salicylideneaniline as the organic compound (A) and 19.07 mass units of AIBN as the radical initiator (B), and heating the reactor until the inner temperature reaches 60° C. Other conditions are the same as Embodiment 1 and performing the same polymerization reaction, to obtain poly(vinyl acetate). The detail is shown in table 1.

Embodiment 6

<Polymerization Process>

Adding 3.12 mass units of salen as the organic compound (A), and heating the reactor until the inner temperature reaches 30° C. Other conditions are the same as Embodiment 1 and performing the same polymerization reaction, to obtain poly(vinyl acetate). The detail is shown in table 1.

Comparative Example 1

<Polymerization Process>

Adding 1.58 mass units of 2'-hydroxyacetophenone as the organic compound (A) and 19.07 mass units of AIBN as the radical initiator (B), and heating the reactor until the inner temperature reaches 60° C. Other conditions are the same as Embodiment 1 and performing the same polymerization reaction, to obtain poly(vinyl acetate). The detail is shown in table 1.

Comparative Example 2

<Polymerization Process>

Adding 1.59 mass units of salicylamide as the organic compound (A) and 19.07 mass units of AIBN as the radical initiator (B), and heating the reactor until the inner temperature reaches 60° C. Other conditions are the same as Embodiment 1 and performing the same polymerization reaction, to obtain poly(vinyl acetate). The detail is shown in table 1.

Comparative Example 3

<Polymerization Process>

Adding 2.79 mass units of 2,2'-(ethane-1,2-diylidenebis (azanylylidene))diphenol as the organic compound (A) and 19.07 mass units of AIBN as the radical initiator (B), and heating the reactor until the inner temperature reaches 60° C. Other conditions are the same as Embodiment 1 and performing the same polymerization reaction, to obtain poly (vinyl acetate). The detail is shown in table 1.

Comparative Example 4

<Polymerization Process>

Adding 0.45 mass units of V-70 as the radical initiator with no addition of the organic compound (A), heating the reactor until the inner temperature reaches 30° C. and then adding 1.31 mass units of DPEt as the termination agent. Other conditions are the same as Embodiment 1 and performing the same polymerization reaction, to obtain poly (vinyl acetate). The detail is shown in table 1.

Comparative Example 5

<Polymerization Process>

Adding 3.67 mass units of salophen as the organic compound (A) and 19.07 mass units of AIBN as the radical initiator (B), and heating the reactor until the inner temperature reaches 60° C. Other conditions are the same as Embodiment 1 and performing the same polymerization reaction. The polymerization is not begun after 5 hours and thus the reaction is stopped.

TABLE 1

| | A | B | Y | B/A | Y/A | temperature [° C.] | time [h] | conversion rate [%] | Mn | ideal Mn | Mn/ideal Mn | Mn/ideal Mn (conversion rate 5%) | Mw/Mn |
|---|---|---|---|---|---|---|---|---|---|---|---|---|---|
| Embodiment 1 | salophen | V70 | VAc | 3 | 1000 | 45 | 1.4 | 4.4 | 17500 | 3800 | 4.6 | 4.3 | 1.70 |
| | | | | | | | 3.0 | 7.7 | 18300 | 6600 | 2.8 | | 1.73 |
| | | | | | | | 3.9 | 10.5 | 19100 | 9100 | 2.1 | | 1.75 |
| | | | | | | | 5.5 | 15.7 | 21000 | 13600 | 1.5 | | 1.77 |
| Embodiment 2 | salophen | V70 | VAc | 1 | 8000 | 45 | 1.9 | 4.8 | 111720 | 33200 | 3.4 | 3.3 | 1.78 |
| | | | | | | | 2.8 | 7.4 | 117660 | 51300 | 2.3 | | 1.82 |
| | | | | | | | 3.7 | 12.5 | 120982 | 85900 | 1.4 | | 1.98 |
| | | | | | | | 4.8 | 17.2 | 136622 | 118000 | 1.2 | | 1.99 |
| Embodiment 3 | salophen | AIBN | VAc | 20 | 500 | 60 | 1.0 | 10.0 | 18600 | 4300 | 4.3 | 5.8 | 1.86 |
| | | | | | | | 1.5 | 17.0 | 16700 | 7400 | 2.3 | | 1.86 |
| | | | | | | | 2.0 | 28.0 | 22200 | 12100 | 1.8 | | 1.77 |
| | | | | | | | 3.0 | 40.0 | 25900 | 17200 | 1.5 | | 1.88 |
| Embodiment 4 | salophen | AIBN | NVP | 10 | 500 | 60 | 3.0 | 13.0 | 10700 | 7300 | 1.5 | 1.6 | 2.07 |
| | | | | | | | 3.7 | 23.6 | 16400 | 13100 | 1.3 | | 3.72 |
| | | | | | | | 4.3 | 39.7 | 26000 | 22100 | 1.2 | | 5.03 |
| | | | | | | | 5.0 | 62.3 | 31000 | 34600 | 0.9 | | 5.23 |
| Embodiment 5 | N-salicylidene aniline | AIBN | VAc | 10 | 1000 | 60 | 1.5 | 8.0 | 93900 | 6900 | 13.6 | 15.8 | 1.65 |
| | | | | | | | 2.0 | 18.0 | 95400 | 15500 | 6.2 | | 1.59 |
| | | | | | | | 2.5 | 19.0 | 96100 | 16400 | 5.9 | | 1.68 |
| | | | | | | | 3.0 | 31.0 | 100200 | 26700 | 3.8 | | 1.64 |
| Embodiment 6 | salen | V70 | VAc | 3 | 1000 | 30 | 0.5 | 8.7 | 110700 | 7500 | 14.8 | 18.9 | 1.69 |
| | | | | | | | 1.0 | 13.2 | 109200 | 11400 | 9.6 | | 1.84 |
| | | | | | | | 1.8 | 19.4 | 124500 | 16800 | 7.4 | | 1.83 |
| | | | | | | | 3.2 | 29.2 | 134900 | 25200 | 5.4 | | 1.84 |
| Comparative example 1 | 2'-hydroxyacetophenone | AIBN | VAc | 10 | 1000 | 60 | 0.1 | 3.0 | 203700 | 2600 | 78.3 | 71.0 | 1.49 |
| | | | | | | | 0.2 | 21.0 | 228700 | 18100 | 12.6 | | 1.61 |
| Comparative example 2 | salicylamide | AIBN | VAc | 10 | 1000 | 60 | 0.2 | 10.0 | 244600 | 8600 | 28.4 | 35.0 | 1.75 |
| | | | | | | | 0.3 | 25.0 | 187000 | 21500 | 8.7 | | 1.98 |
| Comparative example 3 | 2,2'-(ethane-1,2-diylidenebis(azanylylidene))diphenol | AIBN | VAc | 3 | 1000 | 60 | 0.1 | 4.1 | 234900 | 3500 | 67.1 | 62.0 | 2.05 |
| | | | | | | | 0.2 | 12.2 | 249400 | 10500 | 23.8 | | 2.08 |
| Comparative example 4 | — | V70 | VAc | — | — | 30 | 0.0 | 3.5 | 249200 | — | — | — | 2.06 |
| | | | | | | | 0.1 | 7.1 | 277100 | — | — | | 1.93 |
| | | | | | | | 0.3 | 12.1 | 271800 | — | — | | 1.99 |
| | | | | | | | 0.6 | 22.4 | 259100 | — | — | | 2.11 |
| Comparative example 5 | salophen | V70 | VAc | 0.1 | 1000 | 45 | 0.5 | 0.1 | | 86 | | | 2.06 |
| | | | | | | | 1.0 | 0.1 | | 86 | | | 1.93 |
| | | | | | | | 3.0 | 0.2 | | 172 | | | 1.99 |
| | | | | | | | 5.0 | 0.2 | | 172 | | | 2.11 |

For Embodiment 1 to 6, when the ratio (Mn/theoretical Mn) is less than 20, Mn is increased according to the increase of conversion, confirming that the polymerization process is controlled.

For Comparative Example 1 to 3, the ratio (Mn/theoretical Mn) is over 20, confirming that the polymerization controllability is not good. For Comparative Example 4, the characteristics of the controlled radical polymerization are confirmed, but the phenomenon of Mn increased according to the increase of the conversion can't be confirmed.

For Comparative Example 5, it is judged as not productive because the occurrence of the polymerization process is hardly to confirm.

What is claimed is:

1. A composition for controlled radical polymerization comprises organic compound (A) having formula (III) and radical initiator (B) existing in a mole ratio (B/A) ranged from 0.5 to 25, the structure of formula (III) is shown as

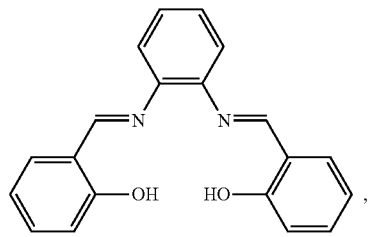

(III)

wherein the formula of organic compound (A) does not contain halogen atoms, sulfur atoms, or metals.

2. The composition of claim 1, further comprising monomer (Y), wherein the monomer (Y) and the organic compound (A) existing in a mole ratio (Y/A) ranged from 300 to 30000.

3. The composition of claim 2, wherein the monomer (Y) includes vinyl acetate.

* * * * *